June 28, 1960 J. L. D. MORRISON ET AL 2,942,890

PHONOGRAPH PICKUP ASSEMBLY

Filed Feb. 19, 1954

INVENTORS.
JAMES L. D. MORRISON
WILLARD J. FAULKNER
BY
Lockwood, Galt, Woodard, & Smith
ATTORNEYS United States Patent Office 2,942,890
Patented June 28, 1960

2,942,890

PHONOGRAPH PICKUP ASSEMBLY

James L. D. Morrison, Benton Harbor, and Willard J. Faulkner, Coloma, Mich., assignors to V-M Corporation, Benton Harbor, Mich., a corporation of Michigan Filed Feb. 19, 1954, Ser. No. 411,372

7 Claims. (Cl. 274—36)

The present invention relates to phonograph pickup assembly and more particularly to pickup assembly of the dual stylus type.

Record changers adapted to play the popular long-playing and standard records are conventionally equipped with dual stylus pickup cartridges which may be operated to shift the proper stylus into operative position for playing these respective records. For the long-playing records, a 1-mil stylus is used and for the higher speed records a 3-mil stylus. It is this type of dual stylus cartridge to which this invention applies.

It is an object of this invention to provide a multi-stylus cartridge having means for manually positioning a selected stylus into operating position.

It is a further object of this invention to provide a dual stylus cartridge which is manually operable to shift the stylus alternatively into and out of playing position.

It is still another object of this invention to provide a dual stylus cartridge in which the stylus-supporting means is manually reciprocated for positioning the styli in playing position.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figures 1, 2, 3, 4, 5:
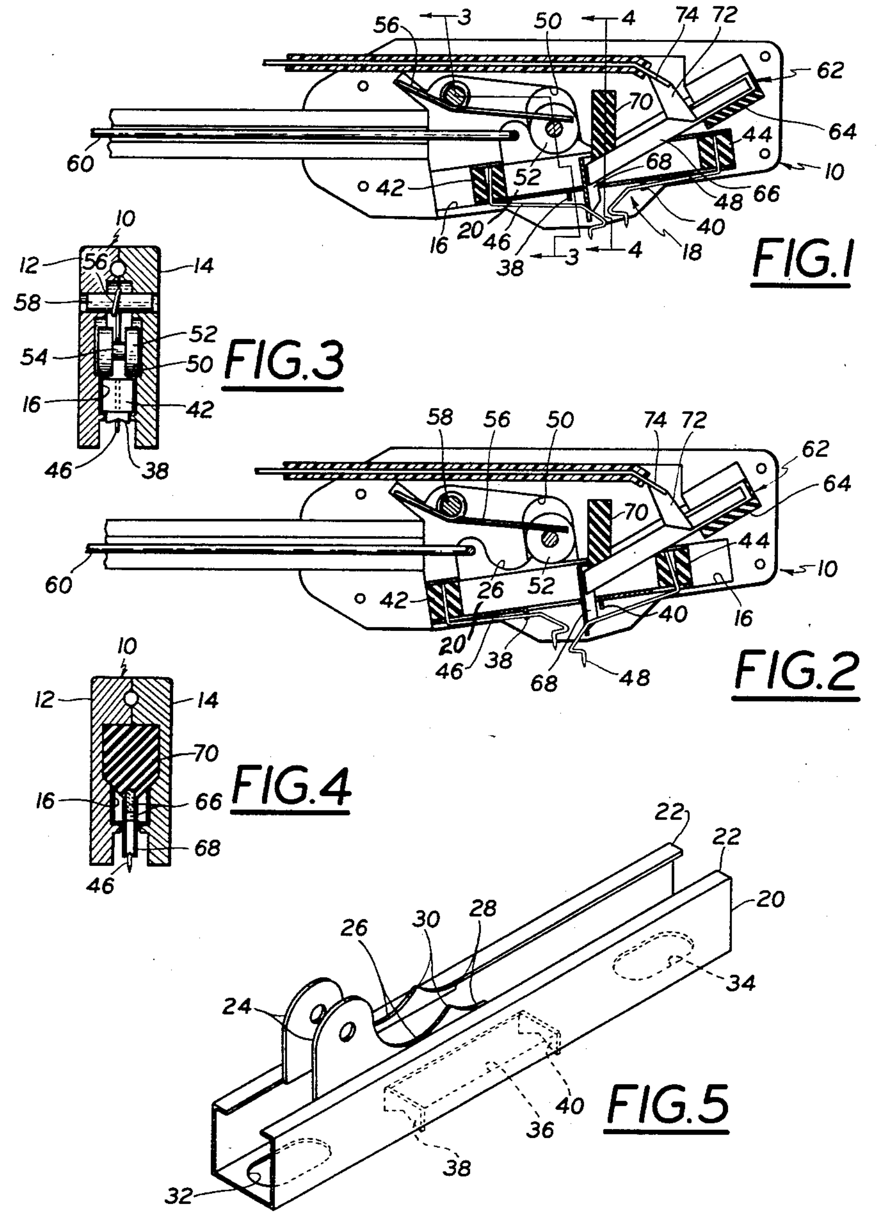
Fig. 1 is a side elevation in longitudinal section of one embodiment of this invention showing one stylus in operative position.
Fig. 2 is a similar view showing the other stylus in operative position.
Fig. 3 is a cross-section taken substantially on line 3—3 of Fig. 1.
Fig. 4 is a cross-section taken substantially on section line 4—4 of Fig. 1.
Fig. 5 is a perspective illustration of the stylus carriage frame.

With reference to the drawings, the assembly of this invention is comprised of a plastic or the like body 10 which preferably is molded of two mating halves 12 and 14 interiorly formed to provide encasement for the mechanism to be described hereinafter. One portion of the body 10 is provided with an elongated guide channel 16 which is illustrated as being orthogonal in cross-section, this channel being adapted to receive for reciprocation a stylus carriage assembly indicated generally by the reference numeral 18.

This assembly 18 includes a channel shaped frame 20 (see Fig. 5) which is elongated and substantially square in cross-section. The frame is provided with two inwardly extending flange portions 22 which at the left end of the frame support two upstanding cam ears 24. These ears 24 are congruently curved to provide first and second rounded cam surfaces 26 and 28 with a peak portion 30 being provided therebetween. The purpose of these cam surfaces will be explained more fully hereinafter. Elongated slots 32 and 34 are provided in the bottom opposite end portions, respectively, of the frame, also for a purpose to be explained more fully hereafter. The frame bottom has another elongated opening 36 intermediate the slots 32 and 34, two depending V-shaped needle rests 38 and 40 being provided on the opposite ends of this opening 36.

The stylus carriage assembly 18 further includes mounting means for the record-playing needles or styli which are mounted in the opposite ends, respectively, of the frame 20. Two rubber blocks 42 and 44 suitably apertured to receive the base ends of two needles 46 and 48 are mounted in these opposite ends, respectively, in registry with the respective slots 32 and 34. An adhesive or any other suitable means may be used for securing the blocks 42 and 44 in the frame 20.

As illustrated in Fig. 1, the shank of the needle 48 is disposed in its needle rest 40 by reason of the resiliency of the block 44, and in Fig. 2 the block 42 is shown to be yieldably urging the needle 46 into engagement with its needle rest 38.

The cartridge case 10 is further provided with an elongated cavity 50 for receiving a detent roller 52. The central portion of roller 52 is reduced in diameter to provide a shaft portion 54 engageable by one end of a detent spring 56 which is pivotally supported on pin 58 in the body 10. The spring 56 is preformed to bias the roller 52 downwardly. As illustrated in Fig. 1, the roller is in locking engagement with the cam surface 26, and in Fig. 2, it is in locking engagement with the other cam surface 28. Operation of the frame 20 to shift the roller 52 from one of the cam surfaces 26, 28 to the other is accomplished by means of an operating rod 60, which may be of ordinary piano wire pivotally secured to the apertured frame ears 24. Thus, by reciprocating the rod 60, the frame 20 may be shifted from one detent position 26, 28 to the other and held in the selected position by the detent roller 52 and spring 56.

An assemblage for converting mechanical vibrations of the needles 46, 48 into electrical energy, which may be utilized by suitable circuitry for producing audible signals, is generally indicated by the reference numeral 62 and may be of conventional construction. A rubber supporting block 64 holds the usual transducer or ceramic-foil vibration-converting member 66 in the body 10. The lower end of this member 66 is mechanically fastened to a forked needle depressor 68 (Fig. 4), this depressor depending partially through the frame opening 36. A rubber backing block 70 (Figs. 1 and 4) engages the back or upper side of the transducer 66 for yieldably restraining the assemblage 66, 68 against upward movement. By means of the rubber blocks 64 and 70, the assemblage 62 is essentially floatingly mounted in the cartridge body 10. The usual metallic-foil pigtails or leads 72 are taken from the opposite sides of the member 66 for connection to the usual signal-conducting wires 74.

In one form of the invention, the styli 46 and 48 are of different sizes, such as 3-mils and 1-mil respectively. The 3-mil stylus is ordinarily used to play the conventional 78-r.p.m. records, whereas the 1-mil stylus is used for playing the conventional 33 and 45-r.p.m. records. Obviously, as will appear from the following, any other size stylus arrangement may be used in this invention without departing from the scope thereof. Fig. 1 illustrates the 3-mil stylus 46 in operative position, and Fig. 2 shows the 1-mil stylus 48 in operative position.

In operation, if it is desired to shift the stylus-carriage assembly 18 from one operative position to the other, such as from the position of Fig. 1 to the position of Fig. 2, the rod 60 is pulled to the left, thereby causing the roller 52 to roll over the cam peak 30 and to fall into locking engagement with the cam surface 28. Accompanying this movement, the stylus 46 is withdrawn to the left out of contact with the stylus depressor 68 and finally into engagement with the stylus rest 38. Simultaneously therewith, the lower inclined portion of the stylus 48 engages the stylus depressor 68 and is thereby forced downwardly into operative position, as seen in Fig. 2. The natural resilience of the stylus-mounting block 44 will yieldably urge the stylus 48 into engagement with the stylus depressor 68.

Reverse movement of the operating rod 60 will force the stylus-carriage assembly 18 to the right in the guide channel 16 until the roller 52 falls into locking engagement with the cam surface 26. Accompanying this movement, the stylus 48 is retracted into contact with its stylus rest 40 and the stylus 46 is protracted into biased engagement with the depressor 68.

In playing operation, vibrations taken from the record by the stylus 46, 48 are transferred to the stylus-depressor 68 and thence to the transducer 66. These mechanical-vibrations are converted into electrical signals which are conducted from the assembly by the wire 74 for reproduction purposes.

The operating rod 60 may conveniently be connected to a rotatable manual control knob which when shifted to one position will move the stylus 48 into playing position, and when shifted to another position will move the other stylus 46 into playing position.

By means of this invention, a convenient and completely reliable pickup mechanism is provided for simply extending the proper stylus into playing position. By using a reciprocatory stylus-changing action in the pickup, a desirably simple manual stylus-changing control is made possible. As explained previously, the operating rod 60 may be reciprocated from a point remotely located with respect to the pickup such that it is not necessary to handle the pickup. Thus, all stylus changing is accomplished without the fear of dropping the pickup and causing consequent damage thereto. Such damage is usually quite costly in the instances in which the styli are formed of diamond or similar material.

What is claimed is:

1. A phonograph cartridge comprising a supporting member, needle-supporting means carried by said supporting member for rectilinear motion only, a plurality of needles operatively mounted on said means, needle-protracting means carried by said member for operative engagement with said needles individually whereby selective movement of said needle-supporting means will serve to protract a respective one of said needles into an operative position, and locating means cooperatively interposed between said needle-supporting means and said supporting member for positioning said needle-supporting means in one of a plurality of preselected positions with respect to said supporting member.

2. A phonograph cartridge comprising a supporting member, needle-supporting means carried by said supporting member for rectilinear motion only, a plurality of needles operatively mounted on said means, needle-protracting means carried by said member for operative engagement with said needles individually whereby selective movement of said needle-supporting means will serve to protract a respective one of said needles into an operative position, detent means carried by said member, and locking-cam means provided on said needle-supporting means for cooperative engagement with said detent means for locking said needle-supporting means in one of a plurality of positions with respect to said supporting member.

3. A phonograph cartridge comprising a body having an elongated slide channel, a needle carriage assembly received by said channel for reciprocation, said assembly including an elongated frame in the opposite ends of which are mounted two needles respectively, a needle depressor operatively mounted on said body for cooperative engagement with said needles upon operating movement of said frame, movement of said frame in one direction causing engagement of one needle with said depressor for moving said one needle into an operative position and movement of said frame in the other direction causing engagement of the other needle with said depressor for moving said other needle into an operative position, and detent means operatively associated with both said body and said frame for selectively positioning each of said needles into fixed engagement with said depressor.

4. A phonograph cartridge comprising a body having an elongated slide channel, a needle carriage assembly received by said channel for reciprocation, said assembly including an elongated frame in the opposite ends of which are mounted two needles respectively, a needle depressor operatively mounted on said body for cooperative engagement with said needles upon operating movement of said frame, movement of said frame in one direction causing engagement of one needle with said depressor for moving said one needle into an operative position and movement of said frame in the other direction causing engagement of the other needle with said depressor for moving said other needle into an operative position, a detent cam surface provided on said frame, and a detent roller carried by said body for operative engagement with said cam surface, said surface having two positioning portions which correspond respectively with the positions of said frame at which said respective needles engage said depressor.

5. A phonograph cartridge comprising a body having an elongated slide channel, a needle carriage assembly received by said channel for reciprocation, said assembly including an elongated frame in the opposite ends of which are mounted two needles respectively, two resilient mounting blocks fixed in the opposite respective ends of said frame, said needles being carried by said mounting blocks respectively, a needle depressor operatively mounted on said body for cooperative engagement with said needles upon operating movement of said frame, movement of said frame in one direction causing engagement of one needle with said depressor for moving said one needle into an operative position and movement of said frame in the other direction causing engagement of the other needle with said depressor for moving said other needle into an operative position, a detent cam surface provided on said frame, and a detent roller carried by said body for operative engagement with said cam surface, said surface having two positioning portions which correspond respectively with the positions of said frame at which said respective needles engage said depressor.

6. A phonograph cartridge comprising a body having an elongated slide channel, a needle carriage assembly received by said channel for reciprocation, said assembly including an elongated frame in the opposite ends of which are mounted two needles respectively, two resilient mounting blocks fixed in the opposite respective ends of said frame, said needles being carried by said mounting blocks respectively, a needle depressor operatively carried by said body for cooperative engagement with said needles upon operating movement of said frame, movement of said frame in one direction causing engagement of one needle with said depressor for moving said one needle into an operative position and movement of said frame in the other direction causing engagement of the other needle with said depressor for moving said other needle into an operative position, a vibration sensitive device operatively connected to said depressor for producing an electrical signal in response to vibration of said depressor by the needle which is engaged therewith, a detent cam surface provided on said frame, and a detent roller carried by said body for operative engagement with said cam surface, said surface having two positioning portions which correspond respectively with the positions of said frame at which said respective needles engage said depressor.

7. A phonograph cartridge comprising a supporting member, needle supporting means carried by said supporting member for rectilinear motion, a plurality of needles carried by said means, and means in the way of movement of said needles engageable by one or the other of said needles when said supporting means is moved for moving an engaged needle from a non-operative position to an operative position.

References Cited in the file of this patent

UNITED STATES PATENTS

| | | |
|---|---|---|
| 1,606,744 | Bodine et al. | Nov. 16, 1926 |
| 1,834,390 | Dunning | Dec. 1, 1931 |
| 2,533,359 | Dann et al. | Dec. 12, 1950 |
| 2,613,939 | Moore | Oct. 14, 1952 |
| 2,689,734 | Wennerbo et al. | Sept. 21, 1954 |
| 2,717,929 | Klingener | Sept. 13, 1955 |
| 2,816,056 | Harris | Dec. 10, 1957 |